United States Patent
Gao et al.

(10) Patent No.: US 11,128,422 B2
(45) Date of Patent: Sep. 21, 2021

(54) NARROWBAND PHYSICAL BROADCAST CHANNEL TRANSMISSION METHOD AND DEVICE

(71) Applicant: CHINA ACADEMY OF TELECOMMUNICATIONS TECHNOLOGY, Beijing (CN)

(72) Inventors: Xuejuan Gao, Beijing (CN); Xueming Pan, Beijing (CN); Yanping Xing, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 128 days.

(21) Appl. No.: 16/069,507

(22) PCT Filed: Dec. 27, 2016

(86) PCT No.: PCT/CN2016/112324
§ 371 (c)(1),
(2) Date: Jul. 11, 2018

(87) PCT Pub. No.: WO2017/121237
PCT Pub. Date: Jul. 20, 2017

(65) Prior Publication Data
US 2019/0028245 A1   Jan. 24, 2019

(30) Foreign Application Priority Data
Jan. 11, 2016 (CN) .......................... 201610015791.4

(51) Int. Cl.
*H04L 5/00* (2006.01)
*H04W 48/12* (2009.01)
(Continued)

(52) U.S. Cl.
CPC ............. *H04L 5/005* (2013.01); *H04L 1/1861* (2013.01); *H04L 5/0092* (2013.01); *H04W 48/10* (2013.01);
(Continued)

(58) Field of Classification Search
CPC ... H04L 1/0036; H04L 1/1861; H04L 5/0007; H04L 5/005; H04L 5/0092; H04L 5/0096;
(Continued)

(56) References Cited

U.S. PATENT DOCUMENTS

2011/0235743 A1   9/2011   Lee et al.
2013/0064216 A1   3/2013   Gao et al.
(Continued)

FOREIGN PATENT DOCUMENTS

CN   103384163 A   11/2013
CN   103716274 A   4/2014
(Continued)

OTHER PUBLICATIONS

International Search Report for PCT/CN2016/112324, dated Mar. 2, 2017, and its English translation provided by WIPO.
(Continued)

*Primary Examiner* — Khoa Huynh
(74) *Attorney, Agent, or Firm* — Ladas & Parry, LLP

(57) ABSTRACT

A narrowband PBCH transmission method and a narrowband PBCH transmission device are provided. A network side device transmits a narrowband PBCH carrying at least CRS transmission indication information. The CRS transmission indication information is to indicate the CRS port number and/or CRS frequency domain position in the LTE system. Through the CRS transmission indication information, it is able to enable the narrowband terminal working simultaneously with the LTE terminal in the LTE bandwidth to obtain the CRS in the LTE system, so that the narrowband
(Continued)

```
┌─────────────────────────────────────────────────────────────┐   301
│ network side device transmitting a narrowband PBCH carrying │
│              at least CRS transmission indication           │
│                        information                          │
└─────────────────────────────────────────────────────────────┘
                              │
                              ▼
┌─────────────────────────────────────────────────────────────┐   302
│ terminal side device receiving a signal transmitted by the  │
│  narrowband PBCH, and receiving the CRS based on the CRS    │
│ transmission indication information carried in the narrow-  │
│                         band PBCH                           │
└─────────────────────────────────────────────────────────────┘
``` downlink transmission may be demodulated through the CRS of the LTE system, and then the signal reception based on the CRS may be realized.

32 Claims, 3 Drawing Sheets

(51) Int. Cl.
*H04W 48/10* (2009.01)
*H04L 1/18* (2006.01)
*H04W 72/00* (2009.01)
*H04W 72/04* (2009.01)
*H04W 4/70* (2018.01)
*H04W 80/02* (2009.01)

(52) U.S. Cl.
CPC ......... *H04W 48/12* (2013.01); *H04W 72/005* (2013.01); *H04W 72/0453* (2013.01); *H04L 5/0053* (2013.01); *H04W 4/70* (2018.02); *H04W 80/02* (2013.01)

(58) Field of Classification Search
CPC .... H04L 27/2657; H04L 5/0053; H04W 4/70; H04W 48/10; H04W 48/12; H04W 72/005; H04W 72/0453; H04W 80/02; H04W 84/04; H04W 72/04
See application file for complete search history.

(56) References Cited

U.S. PATENT DOCUMENTS

| | | | |
|---|---|---|---|
| 2013/0077582 A1 | 3/2013 | Kim et al. | |
| 2013/0301552 A1 | 11/2013 | Xu et al. | |
| 2014/0036806 A1* | 2/2014 | Chen ................ | H04W 72/0406 370/329 |
| 2014/0301305 A1 | 10/2014 | Hao et al. | |
| 2015/0016239 A1 | 1/2015 | Yi et al. | |
| 2015/0049693 A1 | 2/2015 | Inkwon et al. | |
| 2015/0237604 A1 | 8/2015 | Shi et al. | |
| 2015/0257173 A1 | 9/2015 | You et al. | |
| 2015/0365209 A1 | 12/2015 | Yi et al. | |
| 2016/0028520 A1 | 1/2016 | Nogami et al. | |
| 2018/0227897 A1* | 8/2018 | Yeo ....................... | H04W 84/04 |
| 2019/0013913 A1 | 1/2019 | Suzuki et al. | |

FOREIGN PATENT DOCUMENTS

| | | |
|---|---|---|
| CN | 103825670 A | 5/2014 |
| CN | 103944627 A | 7/2014 |
| CN | 104639229 A | 5/2015 |
| CN | 104969490 A | 10/2015 |
| CN | 105122715 A | 12/2015 |
| JP | 2019041135 A | 3/2019 |
| WO | 2014136682 A | 9/2014 |

OTHER PUBLICATIONS

Written Opinion for PCT/CN2016/112324, dated Mar. 2, 2017, and its English translation provided by Google Translate.
From 16884789.5, Extended European Search Report, dated Nov. 23, 2018.
Samsung, "Narrowband IoT—Broadcast Channel Design", 3GPP, vol. RAN WG1, No. Malmo, Sweden, Oct. 4, 2015.
Fujitsu, "Considerations on the issues of Low-cost MTC UEs based on LTE", 3GPP, vol. RAN WG1, St. Julian's, Malta, Jan. 18, 2013.
LG Electronics, "Overview on design of downlink for NB-IoT", 3GPP, vol. RAN WG1, Malmo, Sweden, Oct. 4, 2015.
From PCT/CN2016/112324, International Preliminary Report on Patentability, dated Jul. 17, 2018 with translation from WIPO.
From PCT/CN2016/112324, Written Opinion of the International Searching Authority, dated Mar. 2, 2017 with translation from WIPO.
From TW 106100676, Taiwanese Office Action, dated Nov. 17, 2018 with translation from Google.
First Office Action and Search Report from CN app. No. 201610015791. 4, dated Apr. 10, 2019, with English translation from Global Dossier.
Notice of Reasons for Refusal, from JP app. No. 2018-536119, dated Jun. 18, 2019, with English translation from Global Dossier.
"NB-IOT—downlink physical layer concept description" R1-156462, 3GPP TSG RAN WG1 Meeting #83, Anaheim, USA, Nov. 15-22, 2015.
"Discussion on Systems Information Design", R2-154528, 3GPP TSG-RAN WG2 #91bis, Malmö, Sweden, Oct. 5-9, 2015.
Fujitsu, "Considerations on the issues of Lo-cost MTC UEs based on LTE", 3GPP, vol. RAN WG1, St. Julian's, Malta, Jan. 18, 2013.
Communication pursuant to Article 94(3) EPC from EP app. No. 16884789.5, dated Dec. 16, 2019.
"DL design for NB-IOT", R1-157070, 3GPP TSG RAN WG1 #83, Nov. 15-22, 2015, Anaheim, USA.
Notice of Final Rejection from KR app. No. 10-2018-7023288, dated Oct. 22, 2020, with English translation from KIPO.
Notification of Reasons for Refusal from TW app. No. 106100676, dated Oct. 7, 2020, with machine English translation.
3rd Generation Partnership Project; Technical Specification Group Radio Access Network; Evolved Universal Terrestrial Radio Access (E-UTRA); Physical channels and modulation (Release 8), 3GPP TS 36.211 V8.0.0, Sep. 2007.
3rd Generation Partnership Project; Technical Specification Group Radio Access Network; Evolved Universal Terrestrial Radio Access (E-UTRA); Physical channels and modulation (Release 13), 3GPP TS 36.211 V13.0.0, Dec. 2015.

* cited by examiner

NARROWBAND PHYSICAL BROADCAST CHANNEL TRANSMISSION METHOD AND DEVICE

CROSS-REFERENCE TO RELATED APPLICATIONS

The present application is the U.S. national phase of PCT Application PCT/CN2016/112324 filed on Dec. 27, 2016 which claims a priority to the Chinese patent application No. 201610015791.4 filed on Jan. 11, 2016, the disclosures of which are incorporated herein by reference in their entireties.

TECHNICAL FIELD

The present disclosure relates to the field of communication technology, and in particular to a narrowband Physical Broadcast Channel (PBCH) transmission method and device.

BACKGROUND

A Machine-to-machine (M2M) communication is a new communication concept, which aims to promote the development of social production and lifestyle by combining various different types of communication technologies. The M2M communication is commonly a small bandwidth system communication service.

The mobile communication network in the related art is designed for communication between people. If it is required to use mobile communication networks to support small-bandwidth system communication, it is needed to optimize the mechanism of the mobile communication system according to the characteristics of the small-bandwidth system communication, so that the small bandwidth system communication may be realized without adversely affecting the traditional human-to-human communication.

In the Narrow Band-Internet Of Thing (NB-IOT) system, the receiving bandwidth of the terminal does not exceed 180 kHz, which is equivalent to one physical resource block (PRB) in the Long Term Evolution (LTE) system. In order to utilize the limited frequency band resources as much as possible, the NB-IOT can work in one PRB within the bandwidth of the existing LTE system, i.e., an in-band mode, or can work with the protection band between the existing LTE system bandwidths, i.e., a guard-band mode, it is also able to assign a dedicated working bandwidth to the NB-IOT, i.e., a stand-alone mode.

In the LTE system, both the synchronization signal and the PBCH are transmitted on 72 subcarriers in the LTE system bandwidth, and the PBCH is demodulated based on a Common Reference Signal (CRS). The LTE terminal may intercept a corresponding part of the CRS in the system CRS sequence according to the actual system bandwidth, and the CRS is transmitted in each downlink subframe in the full bandwidth range.

When the NB-IOT terminal detects the synchronization signal within the bandwidth of the LTE system and further receives the narrowband PBCH (NB-PBCH), the NB-PBCH can theoretically be transmitted in any PRB in the system bandwidth, while the NB-IOT terminal does not know which PRB in the LTE system bandwidth is the one where the PBCH transmission is located, so that the CRS in the LTE system cannot be used for data demodulation.

Therefore, there is a need for a new PBCH transmission scheme to enable the narrowband downlink transmission to be demodulated through the CRS of the LTE system.

SUMMARY

Technical Issues to be Solved

The present disclosure provides a narrowband PBCH transmission method and device, to enable the narrowband downlink transmission to be demodulated through the CRS of the LTE system.

Technical Scheme

A narrowband PBCH transmission method is provided in the present disclosure, including: transmitting by a network side device a narrowband PBCH carrying at least CRS transmission indication information.

Optionally, the CRS transmission indication information includes one or two of the following indication information: CRS port number indication information in an LTE system; CRS frequency domain position indication information in the LTE system.

Optionally, the CRS port number indication information includes: 1-bit CRS port number indication information to indicate 1-port CRS transmission or 2-port CRS transmission; or 2-bit CRS port number indication information to indicate 1-port CRS transmission, 2-port CRS transmission or 4-port CRS transmission.

Optionally, the CRS frequency domain position indication information is to indicate an LTE system bandwidth and a location of a resource block (RB) of the narrowband transmission in the LTE system bandwidth.

Optionally, the CRS frequency domain location indication information includes: N-bit indication information to indicate the LTE system bandwidth and B-bit indication information to indicate an index or the location of the RB of the narrowband transmission in the LTE system bandwidth; or K-bit indication information to jointly indicate the LTE system bandwidth, and the index or the location of the RB of the narrowband transmission in the LTE system bandwidth.

Optionally, $N=\lceil \log_2 A \rceil$, is the quantity of existing types of LTE system bandwidths or the quantity of types of LTE system bandwidth supporting the narrowband transmission, or $N=3$; and/or $B=\lceil \log_2 N_{RB}^{max,DL} \rceil$, where $N_{RB}^{max,DL}$ is a maximum quantity of RBs in the LTE system, or $$B = \left\lceil \log_2 \left( \max_{i \in A} N_{RB,i}^{DL} \right) \right\rceil,$$

where $N_{RB,i}^{DL}$ is the quantity of available RBs in each of the A types of LTE system bandwidth, or $B=\lceil \log_2 N_{RB}^{NB,DL} \rceil$, where $N_{RB}^{NB,DL}$ is the quantity of RBs available for the narrowband transmission, or $B=7$.

Optionally, where $$K = \left\lceil \log_2 \sum_{i=0}^{A-1} N_{RB,i}^{DL} \right\rceil,$$

$N_{RB,i}^{DL}$ is the quantity of available RBs in each of the A types of LTE system bandwidth, or $K=9$ or 8.

Optionally, the CRS frequency domain location indication information is to indicate an offset of a frequency domain location of the narrowband transmission relative to a specific frequency domain location in the LTE system.

Optionally, the CRS frequency domain location indication information includes: 1-bit indication information to indicate that a frequency domain resource of the narrowband transmission is located at a high frequency band or a low frequency band divided by a center frequency point of a LTE system bandwidth; C-bit indication information to indicate an offset of the frequency domain location of the narrowband transmission relative to the center frequency point.

Optionally, the offset is a subcarrier offset or calculated in units of one half of RB or six subcarriers.

Optionally, in the case that the offset is the subcarrier offset, $$C = \lceil \log_2(N_{sc}^{RB} \times \max_{i \in A}(N_{RB,i}^{DL})/2) \rceil,$$

where $N_{RB,i}^{DL}$ is the quantity of available RBs in each of the A types of LTE system bandwidth, $N_{sc}^{RB}$ is the quantity of subcarriers of one RB in the LTE system, or C=10; or in the case that the offset is calculated in units of one half of RB or six subcarriers, $$C = \lceil \log_2 \max_{i \in A}(N_{RB,i}^{DL}) \rceil,$$

where $N_{RB,i}^{DL}$ is the quantity of available RBs in each of the A types of LTE system bandwidth; or C=7.

Optionally, the CRS frequency domain location indication information includes: 1-bit indication information to indicate that the LTE system bandwidth includes an odd or an even number of available RBs; 1-bit indication information to indicate that a frequency domain resource of the narrowband transmission is located at a high frequency band or a low frequency band divided by a center frequency point of a LTE system bandwidth; and D-bit indication information to indicate a RB offset of the frequency domain location of the narrowband transmission relative to the center frequency point or a center RB of the LTE system bandwidth, where the RB offset is an integer number of RBs.

Optionally, $$D = \lceil \log_2(\max_{i \in A}(N_{RB,i}^{DL})/2) \rceil,$$

where $N_{RB,i}^{DL}$ is the quantity of available RBs in each of the A types of LTE system bandwidth; or D=6.

Optionally, the CRS frequency domain location indication information is to indicate a relative position of a CRS corresponding to a frequency domain resource of the narrowband transmission in a CRS sequence of the LTE system.

Optionally, the CRS frequency domain location indication information includes: 1-bit indication information to indicate that a frequency domain resource of the narrowband transmission is located at a high frequency band or a low frequency band divided by a center frequency point of a LIFE system bandwidth; E-bit indication information to indicate a CRS offset of the CRS corresponding to the frequency domain resource of the narrowband transmission relative to the center frequency point.

Optionally, $$E = \lceil \log_2 \max_{i \in A}(N_{RB,i}^{DL}) \rceil,$$

$N_{RB,i}^{DL}$ is the quantity of available RBs in each of the A types of LTE system bandwidth; or E=7.

Optionally, the narrowband PBCH further carries one or two of the following indication information: indication information to indicate whether the narrowband includes an LTE control region; indication information to indicate a size of the LTE control region.

A narrowband PBCH transmission method is further provided in the present disclosure, including: receiving by a terminal side device a narrowband PBCH carrying CRS transmission indication information.

Optionally, the CRS transmission indication information includes one or two of the following indication information: CRS port number indication information in a Long Term Evolution (LTE) system; CRS frequency domain position indication information in the LTE system.

Optionally, the CRS port number indication information includes: 1-bit CRS port number indication information to indicate 1-port CRS transmission or 2-port CRS transmission; or 2-bit CRS port number indication information to indicate 1-port CRS transmission 2-port CRS transmission or 4-port CRS transmission.

Optionally, the CRS frequency domain position indication information is to indicate an LTE system bandwidth and a location of a resource block (RB) of the narrowband transmission in the LTE system bandwidth.

Optionally, the CRS frequency domain location indication information includes: N-bit indication information to indicate the LTE system bandwidth and B-bit indication information to indicate an index or the location of the RB of the narrowband transmission in the LTE system bandwidth; or K-bit indication information to jointly indicate the LTE system bandwidth, and the index or the location of the RB of the narrowband transmission in the LTE system bandwidth.

Optionally, $N = \lceil \log_2 A \rceil$, A is the quantity of existing types of LTE system bandwidths or the quantity of types of LTE system bandwidth supporting the narrowband transmission, or N=3; and/or $B = \lceil \log_2 N_{RB}^{max,DL} \rceil$, where $N_{RB}^{max,DL}$ is a maximum quantity of RBs in the LTE system, or $$B = \lceil \log_2(\max_{i \in A} N_{RB,i}^{DL}) \rceil,$$

where $N_{RB,i}^{DL}$ is the quantity of available RBs in each of the A types of LTE system bandwidth, or $B = \lceil \log_2 N_{RB}^{NB,DL} \rceil$, where $N_{RB}^{NB,DL}$ is the quantity of RBs available for the narrowband transmission, or B=7.

Optionally, $$K = \lceil \log_2 \sum_{i=0}^{A-1} N_{RB,i}^{DL} \rceil,$$

$N_{RB,i}^{DL}$ is the quantity of available RBs in each of the A types of LTE system bandwidth, or K=9 or 8.

Optionally, the CRS frequency domain location indication information is to indicate an offset of a frequency domain location of the narrowband transmission relative to a specific frequency domain location in the LTE system.

Optionally, the CRS frequency domain location indication information includes: 1-bit indication information to indicate that a frequency domain resource of the narrowband transmission is located at a high frequency band or a low frequency band divided by a center frequency point of a LTE system bandwidth; C-bit indication information to indicate an offset of the frequency domain location of the narrowband transmission relative to the center frequency point.

Optionally, the offset is a subcarrier offset or calculated in units of one half of RB or six subcarriers.

Optionally, in the case that the offset is the subcarrier offset, $$C = \left\lceil \log_2 \left( N_{sc}^{RB} \times \max_{i \in A}(N_{RB,i}^{DL})/2 \right) \right\rceil,$$

where $N_{RB,i}^{DL}$ is the quantity of available RBs in each of the A types of LTE system bandwidth, $N_{sc}^{RB}$ is the quantity of subcarriers of one RB in the LTE system, or C=10; or in the case that the offset is calculated in units of one half of RB or six subcarriers, $$C = \left\lceil \log_2 \max_{i \in A}(N_{RB,i}^{DL}) \right\rceil,$$

where $N_{RB,i}^{DL}$ is the quantity of available RBs in each of the A types of Lib system bandwidth; or C=7.

Optionally, the CRS frequency domain location indication information includes: 1-bit indication information to indicate that the LTE system bandwidth includes an odd or an even number of available RBs; 1-bit indication information to indicate that a frequency domain resource of the narrowband transmission is located at a high frequency band or a low frequency band divided by a center frequency point of a LTE system bandwidth; and D-bit indication information to indicate a RB offset of the frequency domain location of the narrowband transmission relative to the center frequency point or a center RB of the LTE system bandwidth, where the RB offset is an integer number of RBs.

Optionally, $$D = \left\lceil \log_2 \left( \max_{i \in A}(N_{RB,i}^{DL})/2 \right) \right\rceil,$$

where $N_{RB,i}^{DL}$ is the quantity of available RBs in each of the A types of LTE system bandwidth; or D=6.

Optionally, the CRS frequency domain location indication information is to indicate a relative position of a CRS corresponding to a frequency domain resource of the narrowband transmission in a CRS sequence of the LTE system.

Optionally, the CRS frequency domain location indication information includes: I-bit indication information to indicate that a frequency domain resource of the narrowband transmission is located at a high frequency band or a low frequency band divided by a center frequency point of a LTE system bandwidth; E-bit indication information to indicate a CRS offset of the CRS corresponding to the frequency domain resource of the narrowband transmission relative to the center frequency point.

Optionally, $$E = \left\lceil \log_2 \max_{i \in A}(N_{RB,i}^{DL}) \right\rceil,$$

$N_{RB,i}^{DL}$ is the quantity of available RBs in each of the A types of LTE system bandwidth; or E=7.

Optionally, the narrowband PBCH further carries one or two of the following indication information: indication information to indicate whether the narrowband includes an LTE control region; indication information to indicate a size of the LTE control region.

Optionally, the method further includes: receiving the CRS based on the CRS transmission indication information.

A narrowband PBCH transmission device is further provided in the present disclosure, including: a processing module, configured to carry CRS transmission indication information on a narrowband PBCH; and a transmission module, configured to transmit the narrowband PBCH.

Optionally, the CRS transmission indication information includes one or two of the following indication information: CRS port number indication information in a Long Term Evolution (LTE) system; CRS frequency domain position indication information in the LTE system.

Optionally, the CRS port number indication information includes: 1-bit CRS port number indication information to indicate 1-port CRS transmission or 2-port CRS transmission; or 2-bit CRS port number indication information to indicate 1-port CRS transmission, 2-port CRS transmission or 4-port CRS transmission.

Optionally, the CRS frequency domain position indication information is to indicate an LTE system bandwidth and a location of a resource block (RB) of the narrowband transmission in the LTE system bandwidth.

Optionally, the CRS frequency domain location indication information includes: N-bit indication information to indicate the LTE system bandwidth and B-bit indication information to indicate an index or the location of the RB of the narrowband transmission in the LTE system bandwidth; or K-bit indication information to jointly indicate the LTE system bandwidth, and the index or the location of the RB of the narrowband transmission in the LTE system bandwidth.

Optionally, N=$\lceil \log_2 A \rceil$, A is the quantity of existing types of LTE system bandwidths or the quantity of types of LTE system bandwidth supporting the narrowband transmission, or N=3; and/or B=$\lceil \log_2 N_{RB}^{max,DL} \rceil$, where $N_{RB}^{max,DL}$ is a maximum quantity of RBs in the LTE system, or $$B = \left\lceil \log_2 \left( \max_{i \in A} N_{RB,i}^{DL} \right) \right\rceil,$$

where $N_{RB,i}^{DL}$ is the quantity of available RBs in each of the A types of LTE system bandwidth, or B=$\lceil \log_2 N_{RB}^{NB,DL} \rceil$, where $N_{RB}^{NB,DL}$ is the quantity of RBs available for the narrowband transmission, or B=7.

Optionally, $$K = \left\lceil \log_2 \sum_{i=0}^{A-1} N_{RB,i}^{DL} \right\rceil,$$

$N_{RB,i}^{DL}$ is the quantity of available RBs in each of the A types of LTE system bandwidth, or K=9 or 8.

Optionally, the CRS frequency domain location indication information is to indicate an offset of a frequency domain location of the narrowband transmission relative to a specific frequency domain location in the LTE system.

Optionally, the CRS frequency domain location indication information includes: 1-bit indication information to indicate that a frequency domain resource of the narrowband transmission is located at a high frequency band or a low frequency band divided by a center frequency point of a LTE system bandwidth; C-bit indication information to indicate an offset of the frequency domain location of the narrowband transmission relative to the center frequency point.

Optionally, the offset is a subcarrier offset or calculated in units of one half of RB or six subcarriers.

Optionally in the case that the offset is the subcarrier offset, $$C = \left\lceil \log_2 \left( N_{sc}^{RB} \times \max_{i \in A}(N_{RB,i}^{DL})/2 \right) \right\rceil,$$

where $N_{RB,i}^{DL}$ is the quantity of available RBs in each of the A types of LTE system bandwidth, $N_{sc}^{RB}$ is the quantity of subcarriers of one RB in the LTE system, or C=10; or in the case that the offset is calculated in units of one half of RB or six subcarriers, $$C = \left\lceil \log_2 \max_{i \in A}(N_{RB,i}^{DL}) \right\rceil,$$

where $N_{RB,i}^{DL}$ is the quantity of available RBs in each of the A types of LIT system bandwidth; or C=7.

Optionally, the CRS frequency domain location indication information includes: 1-bit indication information to indicate that the LTE system bandwidth includes an odd or an even number of available RBs; 1-bit indication information to indicate that a frequency domain resource of the narrowband transmission is located at a high frequency band or a low frequency band divided by a center frequency point of a LTE system bandwidth; and D-bit indication information to indicate a RB offset of the frequency domain location of the narrowband transmission relative to the center frequency point or a center RB of the LTE system bandwidth where the RB offset is an integer number of RBs.

Optionally, $$D = \left\lceil \log_2 \left( \max_{i \in A}(N_{RB,i}^{DL})/2 \right) \right\rceil,$$

where $N_{RB,i}^{DL}$ is the quantity of available RBs in each of the A types of LTE system bandwidth; or D=6.

Optionally, the CRS frequency domain location indication information is to indicate a relative position of a CRS corresponding to a frequency domain resource of the narrowband transmission in a CRS sequence of the LTE system.

Optionally, the CRS frequency domain location indication information includes: 1-bit indication information to indicate that a frequency domain resource of the narrowband transmission is located at a high frequency band or a low frequency band divided by a center frequency point of a LTE system bandwidth; E-bit indication information to indicate a CRS offset of the CRS corresponding to the frequency domain resource of the narrowband transmission relative to the center frequency point.

Optionally, $$E = \left\lceil \log_2 \max_{i \in A}(N_{RB,i}^{DL}) \right\rceil,$$

$N_{RB,i}^{DL}$ is the quantity of available RBs in each of the A types of LTE system bandwidth; or E=7.

Optionally, the narrowband PBCH further carries one or two of the following indication information: indication information to indicate whether the narrowband includes an LTE control region; indication information to indicate a size of the LTE control region.

A narrowband PBCH transmission device is further provided in the present disclosure, including: a first receiving module, configured to receive a narrowband PBCH carrying at least CRS transmission indication information.

Optionally, the CRS transmission indication information includes one or two of the following indication information; CRS port number indication information in a LTE system CRS frequency domain position indication information in the LTE system.

Optionally, the CRS port number indication information includes: 1-bit CRS port number indication information to indicate 1-port CRS transmission or 2-port CRS transmission; or 2-bit CRS port number indication information to indicate 1-port CRS transmission, 2-port CRS transmission or 4-port CRS transmission.

Optionally, the CRS frequency domain position indication information is to indicate an LTE system bandwidth and a location of a resource block (RB) of the narrowband transmission in the LTE system bandwidth.

Optionally, the CRS frequency domain location indication information includes: N-bit indication information to indicate the LTE system bandwidth and B-bit indication information to indicate an index or the location of the RB of the narrowband transmission in the LTE system bandwidth; or K-bit indication information to jointly indicate the LTE system bandwidth, and the index or the location of the RB of the narrowband transmission in the LTE system bandwidth.

Optionally, $N = \lceil \log_2 A \rceil$, A is the quantity of existing types of LTE system bandwidths or the quantity of types of LTE system bandwidth supporting the narrowband transmission, or N=3; and/or $B = \lceil \log_2 N_{RB}^{max,DL} \rceil$, where $N_{RB}^{max,DL}$ is a maximum quantity of RBs in the LTE system, or $$B = \left\lceil \log_2 \left( \max_{i \in A} N_{RB,i}^{DL} \right) \right\rceil,$$

where $N_{RB,i}^{DL}$ is the quantity of available RBs in each of the A types of LTE system bandwidth, or $B = \lceil \log_2 N_{RB}^{NB,DL} \rceil$, where $N_{RB}^{NB,DL}$ is the quantity of RBs available for the narrowband transmission, or B=7.

Optionally, $$K = \left\lceil \log_2 \sum_{i=0}^{A-1} N_{RB,i}^{DL} \right\rceil,$$

$N_{RB,i}^{DL}$ is the quantity of available RBs in each of the A types of LTE system bandwidth, or K=9 or 8.

Optionally, the CRS frequency domain location indication information is to indicate an offset of a frequency domain location of the narrowband transmission relative to a specific frequency domain location in the LTE system.

Optionally, the CRS frequency domain location indication information includes: 1-bit indication information to indicate that a frequency domain resource of the narrowband transmission is located at a high frequency band or a low frequency band divided by a center frequency point of a LTE system bandwidth; C-bit indication information to indicate an offset of the frequency domain location of the narrowband transmission relative to the enter frequency point.

Optionally, the offset is a subcarrier offset or calculated in units of one half of RB or six subcarriers.

Optionally, in the case that the offset is the subcarrier offset, $$C = \left\lceil \log_2\left(N_{sc}^{RB} \times \max_{i \in A}(N_{RB,i}^{DL})/2\right)\right\rceil,$$

where $N_{RB,i}^{DL}$ is the quantity of available RBs in each of the A types of LTE system bandwidth, $N_{sc}^{RB}$ is the quantity of subcarriers of one RB in the LTE system, or C=10; or in the case that the offset is calculated in units of one half of RB or six subcarriers, $$C = \left\lceil \log_2 \max_{i \in A}(N_{RB,i}^{DL})\right\rceil,$$

where $N_{RB,i}^{DL}$ is the quantity of available RBs in each of the A types of LTE system bandwidth; or C=7.

Optionally, the CRS frequency domain location indication information includes: 1-bit indication information to indicate that the LTE system bandwidth includes an odd or an even number of available RBs; 1-bit indication information to indicate that a frequency domain resource of the narrowband transmission is located at a high frequency band or a low frequency band divided by a center frequency point of a LTE system bandwidth; and D-bit indication information to indicate a RB offset of the frequency domain location of the narrowband transmission relative to the center frequency point or a center RB of the LTE system bandwidth, where the RB offset is an integer number of RBs.

Optionally, $$D = \left\lceil \log_2\left(\max_{i \in A}(N_{RB,i}^{DL})/2\right)\right\rceil,$$

where $N_{RB,i}^{DL}$ is the quantity of available RBs in each of the A types of LTE system bandwidth; or D=6.

Optionally, the CRS frequency domain location indication information is to indicate a relative position of a CRS corresponding to a frequency domain resource of the narrowband transmission in a CRS sequence of the LTE system.

Optionally, the CRS frequency domain location indication information includes: 1-bit indication information to indicate that a frequency domain resource of the narrowband transmission is located at a high frequency band or a low frequency band divided by a center frequency point of a LTE system bandwidth; E-bit indication information to indicate a CRS offset of the CRS corresponding to the frequency domain resource of the narrowband transmission relative to the center frequency point.

Optionally, $$E = \left\lceil \log_2 \max_{i \in A}(N_{RB,i}^{DL})\right\rceil,$$

$N_{RB,i}^{DL}$ is the quantity of available RBs in each of the A types of LTE system bandwidth; or E=7.

Optionally, the narrowband PBCH further carries one or two of the following indication information: indication information to indicate whether the narrowband includes an LTE control region: indication information to indicate a size of the LTE control region.

A network side device is further provided in the present disclosure, including a processor, a memory, a transceiver and a bus interface connected to each other via a bus, where the processor is configured to read a program in the memory to enable the network side device to: transmit a narrowband PBCH carrying at least CRS transmission indication information.

A terminal side device is further provided in the present disclosure, including a processor, a memory, a transceiver and a bus interface connected to each other via a bus, where the processor is configured to read a program in the memory to enable the terminal side device to: receive a narrowband PBCH carrying CRS transmission indication information.

Technical Effect

According to the embodiments of the present disclosure, because the CRS transmission indication information is carried in the narrowband PBCH, and the CRS transmission indication information is to indicate the CRS port number and/or CRS frequency domain position in the LTE system. Through the CRS transmission indication information, it is able to enable the narrowband terminal working simultaneously with the LTE terminal in the LTE bandwidth to obtain the CRS in the LTE system, so that the narrowband downlink transmission may be demodulated through the CRS of the LTE system, and then the signal reception based on the CRS may be realized.

BRIE DESCRIPTION OF THE DRAWINGS

In order to illustrate the technical solutions of the present disclosure or the related art a clearer manner, the drawings desired for the present disclosure or the related art will be described hereinafter briefly. Obviously, the following drawings merely relate to some embodiments of the present disclosure, and based on these drawings, a person skilled in the art ay obtain the other drawings without any creative effort.

DETAILED DESCRIPTION

Figure 1:
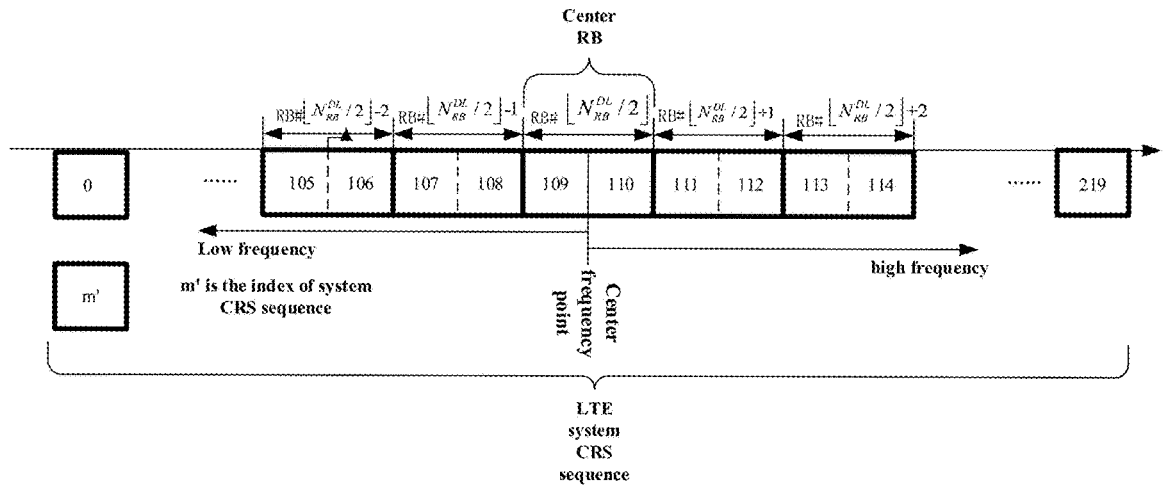
FIG. 1 is a schematic diagram of a mapping relationship between a RB and a CRS sequence in the case that the LTE system bandwidth includes an odd number of RBs in some embodiments of the present disclosure.

The present disclosure will be described hereinafter in a clear and complete manner in conjunction with the drawings and embodiments.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely to differentiate different components rather than to represent any order, number or importance. Similarly, such words as "one" or "one of" are merely to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely to represent relative position relationship, and when an absolute position of the object is changed, the relative position relationship will be changed too.

The present disclosure will be described hereinafter in conjunction with the drawings and embodiments. The following embodiments are for illustrative purposes only, but shall not be to limit the scope of the present disclosure.

The NB-PBCH (narrowband PBCH) in the NB-IOT system is a periodic transmission, which may theoretically be transmitted in any PRB in the system bandwidth, and the NB-IOT terminal does not know which PRB in the LTE system bandwidth is the one where the PBCH transmission is located. Therefore, data demodulation may not be performed using the CRS in the LTE system.

In order to solve the above technical issues, a possible solution is to define a new narrowband RS (NB-RS) for NB-PBCH demodulation, and the data demodulation of the subsequent narrowband downlink data transmission (e.g., the narrowband downlink control channel (NB-PDCCH) transmission, the narrowband downlink shared channel (NB-PDSCH) transmission) is based on the NB-RS. In the case that the CRS in the LTE system always exists in each downlink subframe, defining a new NB-RS will increase the system RS overhead.

A narrowband PBCH transmission method is provided in some embodiments of the present disclosure, which does not need to increase the system RS overhead of other downlink data transmissions after the PBCH is received, and the indication information that may determine the LTE CRS transmission is carried in the narrowband PBCH, to ensure that it is able to enable the narrowband terminal working simultaneously with the LTE terminal in the LTE bandwidth to obtain the CRS in the LTE system to perform the signal reception.

Before describing the embodiments of the present disclosure, a brief description of the CRS in the LTE system is first made.

In the LTE system, the synchronization signal and the PBCH are transmitted on 72 subcarriers in the middle of the LTE system bandwidth, and the PBCH is demodulated based on the CRS. The CRS sequence is related to the cell ID, and the sequence length is always generated based on the quantity of maximum downlink RBs (Resource Blocks) predetermined by LTE. Currently, it is generated based on 110 RB lengths. For each CRS port, two CRSs are included in each RB on one CRS-mapped Orthogonal Frequency Division Multiplexing (OFDM) symbol. Therefore, the system CRS sequence length on one OFDM symbol on each port is 220.

Figure 2:
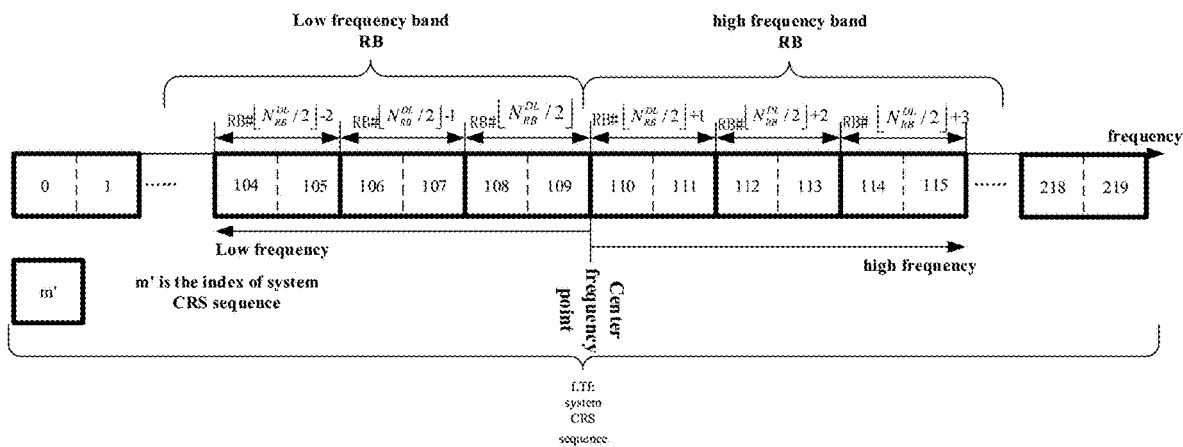
FIG. 2 is a schematic diagram of a mapping relationship between a RB and a CRS sequence in the case that the LTE system bandwidth includes an even number of RBs in some embodiments of the present disclosure.

FIG. 1 is a schematic diagram of a mapping relationship between a RB and a CRS sequence in the case that the LTE system bandwidth includes an odd number of RBs, and FIG. 2 is a schematic diagram of a mapping relationship between a RB and a CRS sequence in the case that the LTE system bandwidth includes an even number of RBs. The numbers in the squares in FIGS. 1 and 2 represent the CRS sequence index number (or number), and RB# represents the RB index number, where $N_{RB}^{DL}$ represents the quantity of available RBs included in the bandwidth of an LTE system (the quantity of available RBs is the quantity of RBs divided by one RB per 180 kHz after the reserved guard band is removed from the system bandwidth). On one CRS antenna port, each RB on the OFDM symbol containing the CRS includes 2 CRSs. In FIG. 1, the center frequency is located in the middle of the RB with index number $\lfloor N_{BR}^{DL}/2 \rfloor$. In FIG. 2, the center frequency is located in the middle of the RB with index numbers $\lfloor N_{RB}^{DL}/2 \rfloor$ and $\lfloor N_{RB}^{DL}/2 \rfloor+1$.

The embodiments of the present disclosure are described in detail below with reference to the drawings.

Embodiment 1

The embodiments of the present disclosure are applicable to an LTE system and an evolved system thereof, and are particularly applicable to a process of performing narrowband PBCH transmission for a narrowband terminal operating in an LTE bandwidth simultaneously with an LTE terminal.

In some embodiments of the present disclosure, the LTE system may be considered to correspond to 3rd Generation Partnership Project (3GPP) Release 8 (Rel-8 or R8). Release 9 (Rel-9 or R9), Release 10 (Rel-10 or RIO) and versions 10 and above. The LTE network structure may be a macro cell, a micro cell, a pico cell, a femto cell, a network of repeaters and relay forwarding nodes, and various hybrid network structures (composed of one or more of a macro cell, a micro cell, a pico cell, a femto cell, and a repeater and a relay forwarding node), and the present disclosure is not limited thereto.

The base station in the embodiments of the present disclosure may be an evolved base station (Evolved Node B, eNB or e-NodeB), a macro base station, a micro base station (also referred to as a "small base station"), a pico base station, an Access Point (AP) or a Transmission Point (TP) in an LTE system or an evolved system thereof.

The terminal in the embodiments of the present disclosure may also be referred to as a user equipment (UE), or may be called a Terminal, a mobile station (MS), a mobile terminal, etc., and the terminal may communicate with one or more core networks via a Radio Access Network (RAN). In particular, the terminal in the embodiments of the present disclosure refers to a narrowband terminal that can work in LTE or its evolved system, such as an Machine-Type Communication (MTC) terminal.

Figure 3:
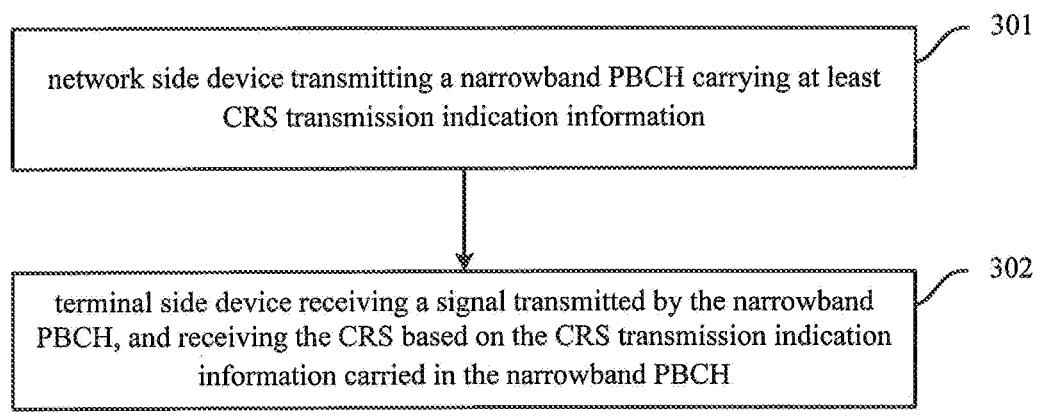
FIG. 3 is a schematic diagram of a narrowband PBCH transmission method in some embodiments of the present disclosure.

FIG. 3 is a schematic diagram of a narrowband PBCH transmission method in some embodiments of the present disclosure. As shown in FIG. 3, the method may include:

Step 301: transmitting a narrowband PBCH carrying at least CRS transmission indication information, where the narrowband PBCH is to transmit system broadcast information and may be transmitted on specific symbols within a specific subframe.

Step 302: receiving a signal transmitted by the narrowband PBCH, and receiving the CRS based on the CRS transmission indication information carried in the narrowband PBCH to perform a signal demodulation.

In the above process, step 301 may be performed by a narrowband PBCH transmitter, and step 302 may be performed by a narrowband PBCH receiver. In a specific application scenario, the base station performs the foregoing step 301, and the terminal performs the foregoing step 302.

In the foregoing process, the CRS transmission indication information includes one or two of the following indication information: CRS port number indication information in a Long Term Evolution (LTE) system; CRS frequency domain position indication information in the LTE system.

The CRS port number indication information includes: 1-bit CRS port number indication information to indicate 1-port CRS transmission or 2-port CRS transmission; or 2-bit CRS port number indication information to indicate 1-port CRS transmission, 2-port CRS transmission or 4-port CRS transmission.

The CRS port number indication information is to indicate 1-port CRS transmission, 2-port CRS transmission or 4-port CRS transmission. In a specific implementation, in order to reduce the transmission resource overhead, in the case of a maximum 2-port CRS transmission, whether 1-port CRS transmission or 2-port CRS transmission is performed may be indicated by 1-bit indication information. In the case of a maximum 4-port CRS transmission, it is able to indicate using one of the 1-port, 2-port, and 4-port CRS transmissions with 2-bit indication information.

After receiving the narrowband PBCH, the terminal may obtain the quantity of CRS ports in the LTE system according to the indication information of the quantity of CRS ports carried in the narrowband PBCH, so that the terminal may obtain CRS on a specific CRS port according to the determined CRS port and the portion numbers in the subsequent downlink data demodulation.

The terminal may determine, according to the indication information of the frequency domain location, which part of the LTE system CRS sequence the CRS corresponding to the narrowband transmission.

Furthermore, the narrowband PBCH further carries one or two of the following indication information: indication information to indicate whether the narrowband includes an LTE control region; indication information to indicate a size of the LTE control region. The indication information is to indicate whether the narrowband includes an LTE control region. Optionally, it is able to use 1-bit indication information to indicate whether the narrowband transmission includes a legacy control region, that is, whether the first P OFDM symbols are available for transmissions of the narrowband downlink control channel and the narrowband downlink shared channel. The indication information is to indicate a size of the LTE control region. For example, the quantity of OFDM symbols P occupied by the LTE control region may be indicated.

There may be a plurality of methods for indicating which part of the CRS sequence of the LTE system is the CRS corresponding to the narrowband transmission by using the indication information of the CRS frequency domain position. The following methods 1, method 2 and method 3 will be described in details.

Method 1

The LTE system bandwidth and the RB position of the narrowband transmission in the LTE system bandwidth are indicated by CRS frequency domain location indication information.

More specifically, it can be implemented by the following method 1-1 or method 1-2.

Method 1-1

The CRS frequency domain location indication information includes: N-bit indication information (N is a positive integer), to indicate the LTE system bandwidth, and B-bit indication information (B is a positive integer), to indicate the position of the RB of narrowband transmission in the LTE system. The "N-bit indication information" is an index number (or number) of the bandwidth of the LTE system in all kinds of LTE system bandwidths. The "B-bit indication information" is the index number (or number) of the RBs occupied by the narrowband transmission in the RBs corresponding to the bandwidth of the LTE system.

In order to reduce the transmission resource overhead, in the CRS frequency domain location indication information, it is able to use $N=\lceil \log_2 A \rceil$ bits to indicate one of A types of LTE system bandwidth (where A is an integer larger than 1, and $\lceil \cdot \rceil$ represents a down rounding operation). A is the quantity of existing types of LTE system bandwidths or the quantity of types of LTE system bandwidth supporting the narrowband transmission. In view of the quantity of types of LTE system bandwidths of existing LTE system bandwidths or that can support narrowband transmission, for example, N may be 3.

In order to reduce the transmission resource overhead, in the CRS frequency domain location indication information, the B-bit indication information may be to indicate the index number of the RB occupied by the narrowband transmission in the RB corresponding to the LTE system bandwidth. Optionally, $B=\lceil \log_2 N_{RB}^{max,DL} \rceil$, where $N_{RB}^{max,DL}$ is the maximum quantity of RBs in the LTE system. In some embodiments, $B=\lceil \log_2 N_{RB,i}^{NB,DL} \rceil$, where $N_{RB,i}^{DL}$ is the quantity of available RBs included in each of the A types of LTE system bandwidths. In some embodiments, $B=\lceil \log_2 N_{RB}^{NB,DL} \rceil$, where $N_{RB}^{NB,DL}$ is the quantity of RBs available for narrowband transmission in the LTE system, and the quantity of RBs available for narrowband transmission may be a predefined or determined according to a predefined rule. For example, Z RBs are predefined for each LTE system bandwidth and can be used for narrowband transmission. For each system bandwidth Z may be the same or different. The RB of a particular location, for example, from the particular frequency domain location, has one RB per interval x/y RBs available for narrowband transmission, which may be the same or different for each system bandwidth x/y. In some embodiments, B=7.

The different system bandwidths supported in the LTE system and the quantity of available RBs included in each bandwidth (RBs in the protected bandwidth part is removed) are as shown in Table 1. Three bits may be to indicate six LTE system bandwidths. As shown in FIG. 2, for a 20 MHz bandwidth, including 100 RBs, 7 bits are required to indicate the RB index number in a system bandwidth, as shown in Table 3.

TABLE 1

6 types of LTE system bandwidths and the quantity of available RBs

| | Channel bandwidth [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

TABLE 2

3 bits indicating the bandwidth of 6 types of LTE systems

| 3-bit bandwidth indication domain | Indicated system bandwidth |
|---|---|
| 000 | 1.4 MHz |
| 001 | 3 MHz |
| 010 | 5 MHz |
| 011 | 10 MHz |
| 100 | 15 MHz |
| 101 | 20 MHz |
| 110 | reserved |
| 111 | reserved |

TABLE 3

7 bits indicating the maximum $N_{RB}^{max,DL}$ number of RB index numbers

| 7-bit bandwidth indication domain | Indicated RB index |
|---|---|
| 0000000 | 0 |
| 0000001 | 1 |
| 0000010 | 2 |
| 0000011 | 3 |
| ... | ... |
| 1100010 | 98 |
| 1100011 | 99 |
| ... | reserved |

Certainly, if more system bandwidths are defined in the following, when the quantity of RBs of the maximum system bandwidth changes, the information may be further indicated in a similar manner and the detailed description thereof is omitted herein.

If the quantity of RBs available for narrowband transmission is less than $N_{RB}^{max,DL}$ or $N_{RB}^{DL}$, or if the RBs for narrowband transmission is a specific part of RBs, the "B-bit indication information may use less bits. For example, if only 4 RB positions are predetermined for narrowband transmission, only 2-bit indication information is required, which may indicate one of 4 predetermined RB positions.

After receiving the narrowband PBCH, the terminal may obtain the LTE system bandwidth and the total number $N_{RB}^{DL}$ of available RBs included in the system bandwidth according to the "N-bit indication information" carried therein. The RB occupied by the narrowband transmission corresponding to RB in the bandwidth of the LTE system may be obtained according to the "B-bit indication information". The RB. According to the determination whether the total number of available RBs $N_{RB}^{DL}$ in the LTE system bandwidth is odd or even, the terminal may determine to use the mapping relationships between RB and CRS shown in FIG. 1 or FIG. 2, and further determine according to the RB index the corresponding CRS sequence corresponding to the RB location.

Method 1-2

The CRS frequency domain location indication information includes K-bit indication information to jointly indicate the LTE system bandwidth, and the index or the location of the RE of the narrowband transmission in the LTE system bandwidth.

Optionally, in order to reduce the transmission resource overhead, the quantity of bits of the joint information may be set to be $$K = \left\lceil \log_2 \sum_{i=0}^{A-1} N_{RB,i}^{DL} \right\rceil,$$

A represents the existing A types of LTE system bandwidth or A types of LTE system bandwidth that can support the narrowband transmission, $N_{RB,i}^{DL}$ is the quantity of RBs in an $i^{th}$ system bandwidth. In some embodiments of the present disclosure, K=9 or 8.

Taking the six LTE system bandwidths and the quantity of available RBs shown in Table 1 above as an example, the joint coding may be performed as 9 bits, as shown in Table 4.

TABLE 4

9 bits indicating joint information of different bandwidths and RB numbers

| 9-bit bandwidth and RB joint indication domain | Indicated bandwidth | Indicated RB index |
|---|---|---|
| 000000000 | 1.4 MHz | 0 |
| 000000001 | 1.4 MHz | 1 |
| 000000010 | 1.4 MHz | 2 |
| 000000011 | 1.4 MHz | 3 |
| 000000100 | 1.4 MHz | 4 |
| 000000101 | 1.4 MHz | 5 |
| 000000110 | 3 MHz | 0 |
| 000000111 | 3 MHz | 1 |
| ... | ... | ... |
| 000010100 | 3 MHz | 14 |
| 000010101 | 5 MHz | 0 |
| 000010110 | 5 MHz | 1 |
| ... | ... | ... |
| 000101101 | 5 MHz | 24 |
| 000101110 | 10 MHz | 0 |
| 000101111 | 10 MHz | 1 |
| ... | ... | ... |
| 001011111 | 10 MHz | 49 |
| 001100000 | 15 MHz | 0 |
| 001100001 | 15 MHz | 1 |
| ... | ... | ... |
| 010101010 | 15 MHz | 74 |
| 010101011 | 20 MHz | 0 |
| 010101100 | 20 MHz | 1 |
| ... | ... | ... |
| 100001110 | 20 MHz | 99 |
| ... | reserved | reserved |

Further, if the 1.4 MHz bandwidth is not supported for narrowband transmission, the state corresponding to 1.4 MHz in the table may be removed. Further, if the middle 6

RBs in each system bandwidth are excluded from being used for narrowband transmissions, that is, the indication fields corresponding to the RB positions are removed from the table, the combined state can be further reduced, thereby requiring only 8 bits of joint encoding information. Furthermore, if the RBs available for narrowband transmission are a specific part of RBs, the quantity of indication bits required may be less. For example, if only 4 predetermined RB positions are available for narrowband transmission, it is only need to reserve the joint information indicating the location of the four RBs in a bandwidth. Therefore, the joint states may be reduced to a large extent, so that joint indication bits are also reduced. For example, only 3, 5, 10, 15, and 20 bandwidths are supported, and only 4 RBs in each bandwidth can be used for narrowband transmission, the quantity of the joint states may be 5*4=20, which requires only 5 bits of indication information. For example, different bandwidths can be defined with different numbers of RBs for the narrowband transmission. The quantity of RBs for a larger bandwidth may be larger, and the quantity of RBs for a smaller bandwidth may be smaller.

After receiving the narrowband PBCH, the terminal may obtain the LTE system bandwidth, the total number of RBs $N_{RB}^{DL}$ included in the LTE system bandwidth and the RB occupied by the narrowband transmission corresponding to the RB in the LTE system bandwidth, according to the indication information in the foregoing method 1-1 or method 1-2 carried in the terminal. According to the determination of whether the total number of available RBs $N_{RB}^{DL}$ in the LTE system bandwidth is odd or even, the terminal may determine the mapping relationship between the RB and the CRS shown in FIG. 1 or FIG. 2, and further determine the CRS sequence corresponding to the RB location based on the indicated RB index.

For example, in conjunction with Table 1, Table 2, and Table 3, if the above method 1-1 is used, the LTE system bandwidth index number indicated by the "N-bit indication information" is 2 in the CRS transmission indication information carried by the narrowband PCH (corresponding binary number is 010), indicating that the system bandwidth is 5 MHz, and the quantity of available RBs $N_{RB}^{DL}$ is 25. The RB indicated by the "B-bit indication information" that occupied by the narrowband transmission has an index number of 17 in the RB corresponding to the 5 MHz system bandwidth. If the method 1-2 is used, the LTE system bandwidth indicated by the "K-bit indication information" is 5 MHz, and the RB occupied by the narrow-band transmission has an index number of 17 in the RB corresponding to the 5 MHz system bandwidth, which is included in the system bandwidth. The available RB number $N_{RB}^{DL}$ is an odd number, and the terminal determines, according to FIG. 1, that the RB whose index number is $\lfloor N_{RB}^{DL}/2 \rfloor=12$ among the 25 RBs is located at the center frequency point and spans the center frequency point. Further, it is able to determine that the CRS corresponding to the RB with the index number 17 is determined to be the CRS at the m'=119 and m'=120 positions in the CRS sequence.

For another example, in combination with Table 1, Table 2, and Table 3, if the LTE system bandwidth indicated by the CRS transmission indication information carried by the narrowband PBCH is 10 MHz, the quantity of available RBs $N_{RB}^{DL}$ included in the narrowband transmission is 50. The index number of the RB occupied by the narrowband transmission corresponding to RB in the system bandwidth is 17. Because the quantity of available RBs in the system bandwidth is even, the terminal determines, according to FIG. 2, that the RB whose index number is $\lfloor N_{RB}^{DL}/2 \rfloor=25$ among the 50 RBs is located at the center frequency point. Further, according to the RB index number 17 indicated in the narrowband PBCH, the CRS corresponding to the RB with the index number 17 is determined to be the CRS a the m'=92 and m'=93 positions in the CRS sequence.

Method 2

The CRS frequency domain location indication information is to indicate an offset of a frequency domain location of the narrowbard transmission (i.e., the frequency domain location of the narrowband PBCH transmission) relative to a specific frequency domain location in the LTE system. The specific frequency domain location may be a center frequency point or a center RB of the LTE system bandwidth.

More specifically, the above process may be implemented by the following method 2-1 or method 2-2.

Method 2-1

The CRS frequency domain location indication information includes: indication information to indicate that a frequency domain resource of the narrowband transmission is located at a high frequency band or a low frequency band divided by a center frequency point of a LTE system bandwidth, and an offset of the frequency domain location of the narrowband transmission relative to the center frequency point.

In order to reduce the transmission resource overhead, in the CRS frequency domain location indication information, it is able to use 1-bit indication information to indicate that the frequency domain location where the narrowband transmission is located is at the high frequency band or the low frequency band divided by the central frequency point in the LTE system bandwidth, and use C-bit (C is an integer) indication information to indicate the offset of the frequency domain position where the narrowband transmission is located relative to the center frequency point. The offset is specifically expressed as an offset of a lowest or highest frequency position of the frequency domain resource where the narrowband transmission is located relative to the center frequency.

The offset may be specifically represented by the quantity of subcarrier offsets. In this case, it is able to use $$C = \left\lceil \log_2\left(N_{sc}^{RB} \times \max_{i \in A}(N_{RB,i}^{DL})/2\right) \right\rceil$$

bits of indication information to indicate the number K of subcarrier offsets of the current narrowband frequency domain resource relative to the center frequency point, for example, $$K = 1, \ldots N_{sc}^{RB} \times \max_{i \in A}(N_{RB,i}^{DL})/2,$$

where $N_{sc}^{RB}$ is the quantity of subcarriers of one RB in the LTE system. In some embodiments, the value of C is 10, For example, a maximum LTE system bandwidth is 20 MHz, $$\max_{i \in A}(N_{RB,i}^{DL}) = 100 \text{ and } N_{sc}^{RB} = 12, \text{ then}$$

-continued $$C = \left\lceil \log_2\left(N_{sc}^{RB} \times \max_{i \in A}(N_{RB,i}^{DL})/2\right) \right\rceil = 10.$$

Embodiment II

After receiving the narrowband PBCH, the terminal may learn, according to the 1-bit indication information carried in the narrowband PBCH, whether the frequency domain location where the narrowband transmission is located is in the high frequency band or the low frequency band divided by the center frequency point of the LTE system bandwidth, and the terminal may further obtain, according to C-bit indication information, the subcarrier offset of the frequency domain position where the narrowband transmission is located relative to the center frequency point, and based on the case that every 6 subcarriers includes 1 CRS, the terminal may determine the specific location of the current narrowband CRS in the CRS of the LTE system. For example, the 1-bit indication information carried in the narrowband PBCH indicates that the frequency domain location where the narrowband transmission is located is in the high frequency band, and the sub-carrier offset indicated by the C-bit indication information is K=66, since every 6 subcarriers includes 1 CRS, 66/6=11, that is, 11 CRSs are offset toward the high frequency band relative to the center frequency point. In other words, the CRS corresponding to the narrowband transmission is a CRS offset by 10 and 11 positions from the center frequency point. That is, from the center frequency point to the high frequency band direction, the CRSs at the 10$^{th}$ and 11$^{th}$ positions are the CRSs at m'=109+10=119 and m'=109+11=120 positions. In this case, it is not necessary to know the LTE system bandwidth and whether the quantity of RBs in the system bandwidth is odd or even.

The above offset may also be calculated in units of ½ RB or 6 subcarriers. In this case, it is able to use $$C = \left\lceil \log_2 \max_{i \in A}(N_{RB,i}^{DL}) \right\rceil$$

bits of indication information to indicate the offset K of the current narrowband frequency domain resource relative to the center frequency point, for example, $$K = 1, \ldots \max_{i \in A}(N_{RB,i}^{DL}),$$

where $N_{RB,i}^{DL}$ is the quantity of available RBs in each of the A types of LTE system bandwidth. In some embodiments of the present disclosure, C=7. For example, a maximum LTE system bandwidth is 20 MHz, $$N_{RB}^{DL} = 100 \text{ or } \max_{i \in A}(N_{RB,i}^{DL}) = 100,$$

in this case, $$C = \left\lceil \log_2 \max_{i \in A}(N_{RB,i}^{DL}) \right\rceil = 7.$$

Embodiment III

After receiving the narrowband PBCH, the terminal may learn, according to the 1-bit indication information carried in the narrowband PBCH, whether the frequency domain location where the narrowband transmission is located is in the high frequency band or the low frequency band divided by the center frequency point of the LTE system bandwidth, and the terminal may further obtain, according to C-bit indication information, the offset of the frequency domain position where the narrowband transmission is located relative to the center frequency point (the offset is calculated in units of ½ RBs or 6 subcarriers), and based on the case that every ½ RBs (i.e., 6 subcarriers) includes 1 CRS, the terminal may determine the specific location of the current narrowband CRS in the CRS of the LTE system. When the value indicated by the C bit is an odd number, it indicates that the current LTE system bandwidth includes an odd number of available RBs, that is, the correspondence between the CRS and the RB is the relationship shown in FIG. 1, although the terminal does not know the system bandwidth at this time, and therefore does not known the value of $N_{RB}^{DL}$ in FIG. 1, but based on the offset of the band indicated by 1-bit indication information and the ½ RB offset relative to the center frequency, the position relative to the center frequency may be derived. For example, the offset indicated by the C bits is 11, the 1 bit is indicated as the high frequency band, and the offset indicated is the offset of the high frequency end of the current narrow band relative to the center frequency point, which indicates that the position of the current narrow band is offset to the high frequency band relative to the center frequency point position by 11 CRS, that is, the CRS corresponding to the current narrow band is at the position of m'=109+11−1=119 and m'=109+11=120 in the CRS sequence, or the position where the current narrowband is located is offset to the high frequency band by 11/2=5.5 RBs relative to the center frequency point position, where 0.5RB is the center RB including the center frequency point. Therefore, starting from m'=111, 5 RB positions are offset to the high frequency band by, i.e., the 5$^{th}$ RB position from the center RB as shown in FIG. 1 is the current narrowband position, so that the CRS corresponding to the narrow band is the CRS at 110+5×2−1=119 and m'=110+ 5×2=120 positions in the CRS sequence or at m'=109+5.5× 2−1=119 and m'=109+5.5×2=120 positions in the CRS sequence. When the offset indicated by the C bit is even, it indicates that the current LTE system bandwidth includes an even number of available RBs, that is, the correspondence between the CRS and the RB is the relationship shown in FIG. 2, although the terminal does not know the system bandwidth, so the value of $N_{RB}^{DL}$ in FIG. 2 is not known, but it can be calculated from the offset of the band indicated by 1 bit and the offset of ½ RB with respect to the center frequency. Relative to the position of the center frequency point, for example, the C bit indication value is 10, 1 bit indicates the high frequency band, and the offset indicated by the convention is the offset of the high frequency end of the current narrow band relative to the center frequency point, indicating the current narrow band The position is offset from the center frequency point position by 10 CRSs to the high frequency band, that is, the CRS corresponding to the current narrow band is m'=109+10−1=118 and m'==109+10=in the CRS sequence. The CRS at position 119, or the position where the current narrowband is located, is offset to the high frequency band by 10/2=5 RBs relative to the center frequency point position, so starting from m'=110, shifting 5 RB positions to the high frequency band The RB, that is, the 5th RB position of the center frequency point as shown in FIG. 2 is the current narrowband position, so that the CRS corresponding to the narrowband is obtained as the CRS at the m'=109+5×2−1=118 position and the m'='109+5×2−119 position.

Method 2-2

The CRS frequency domain location indication information includes: an indication that the quantity of RBs included in the bandwidth of the LTE system is an odd or an even number, and the frequency domain resource in which the narrowband transmission is located is in the high frequency band or the low frequency band of the LTE system bandwidth divided by the central frequency point, and the RB offset of the frequency domain location of the narrowband transmission relative to the bandwidth center frequency of the LTE system (the offset is an integer).

In order to reduce the transmission resource overhead, in the CRS frequency domain location indication information, it is able to use 1-bit indication information to indicate whether the quantity of available RBs included in the LTE system bandwidth is odd or even (or replaced by 1-bit equivalent information), use 1-bit indication information to indicate whether the frequency domain resource in which the current narrowband transmission is located is a high frequency band or a low frequency band, divided by a central frequency point in the LTE system bandwidth, and use D-bit (D is an integer) indication information to a RB offset of the frequency domain resource of the current narrowband transmission relative to the center frequency point or a center RB of the LTE system bandwidth, where the RB offset is an integer number of RBs.

Optionally, it is able to use $$D = \left\lceil \log_2\left(\max_{i \in A}(N_{RB,i}^{DL})/2\right)\right\rceil$$

bits of indication information to indicate the offset RB number of the current narrowband frequency domain resource relative to the center frequency point or the center RB, for example, $$K = 1, \ldots \max_{i \in A}(N_{RB,i}^{DL})/2,$$

where $N_{RB,i}^{DL}$ is the quantity of available RBs in each of the A types of LTE system bandwidth. In some embodiments of the present disclosure, D=7. For example, a maximum LTE system bandwidth is 20 MHz, $$N_{RB}^{DL} = 100 \text{ or } \max_{i \in A}(N_{RB,i}^{DL}) = 100,$$

in this case, $$D = \left\lceil \log_2\left(\max_{i \in A}(N_{RB,i}^{DL})/2\right)\right\rceil = 6.$$

Further, in the foregoing method, if only part of the frequency domain position in the system bandwidth is used for narrowband transmission, the value of the above D may be reduced, thereby saving more transmission overhead.

Embodiment IV

After receiving the narrowband PBCH, the terminal can learn whether the quantity of RBs included in the LTE system bandwidth is odd or even according to the 1-bit indication information in the narrowband PBCH, so as to determine the correspondence between the LTE system RB and the LTE system CRS is in the manner shown in FIG. 2 or FIG. 1. The corresponding RB position is determined according to the RB offset indicated by the D-bit and the high and low frequency position indicated by the 1-bit relative to the center frequency point, thereby obtaining the CRS within the RB based on the correspondence between the RB and the CRS. For example, if 1 bit indicates that the LTE system bandwidth includes an odd number of RBs, then it is determined that the correspondence relationship is as shown in FIG. 1, the D bit indicates that the RB offset is 5, and 1 bit indicates the high frequency band, then based on the correspondence shown in FIG. 1, there is a center RB, the RB offset of the high frequency band is relative to the center RB position. Therefore, the start of the high frequency band C''=111, 5 RBs is offset, and each RB includes 2 CRSs, then the CRS in the RB where the current narrowband is located is a CRS at m'=110+5×2−1=119 and m'=110+5×2=120 positions. For another example, 1 bit indicates that the LTE system bandwidth includes an even number of RBs, then it is determined that the correspondence relationship is as shown in FIG. 2. The D bit indicates that the RB offset is 5, and 1 bit indicates the high frequency band. According to the mapping relationship of FIG. 2, there is no center RB, and the RB offset of the high frequency band is relative to the center frequency point position. Therefore, the start of the high-band CRS is m'=110, 5 RBs is offset, and each RB contains 2 CRSs, then the CRS in the RB where the current narrowband is located is at m'109+5+2−1=118 and m'=109+5×2=CRS positions.

Method 3

The CRS frequency domain location indication information is to indicate a relative position of a CRS corresponding to a frequency domain resource of the narrowband transmission in a CRS sequence of the LTE system.

The CRS frequency domain location indication information includes: indication information to indicate that a frequency domain resource of the narrowband transmission is located at a high frequency band or a low frequency band divided by a center frequency point of a LTE system bandwidth and a CRS offset of the CRS corresponding to the frequency domain resource of the narrowband transmission relative to the center frequency point.

In order to reduce the transmission resource overhead, in the CRS frequency domain location indication information, the 1-bit indication information may be to indicate whether the frequency domain resource in which the current narrowband transmission is located is located in the LTE system bandwidth, the high frequency band or the low frequency band divided by the central frequency point, and E is used. (E is an integer) The bit indication information indicates the offset of the CRS corresponding to the frequency domain resource in which the current narrowband is located with respect to the CRS at the center frequency point. The specific expression of the offset can be the same as the above method 2-2, except that the physical interpretation of the indication domain is different.

Optionally, it is able to use $$E = \left\lceil \log_2 \max_{i \in A} (N_{RB,i}^{DL}) \right\rceil$$

bits of indication information to indicate the CRS offset K of the CRS corresponding to the frequency domain resource of the current narrowband relative to the center frequency point, for example, $$K = 1, \ldots \max_{i \in A}(N_{RB,i}^{DL}),$$

where $N_{RB,i}^{DL}$ is the quantity of available RBs in each of the A types of LTE system bandwidth. In some embodiments of the present disclosure, E=7. $N_{sc}^{RB}$ is the quantity of subcarriers of one RB in the LTE system. For example, a LTE system bandwidth is 20 MHz, $$N_{RB}^{DL} = 100, \text{ or } \max_{i \in A}(N_{RB,i}^{DL}) = 100,$$

then $$E = \left\lceil \log_2 \max_{i \in A} (N_{RB,i}^{DL}) \right\rceil = 7.$$

Further, in the above method, if only part of the frequency domain position in the system bandwidth is available for narrowband transmission, the value of the above E can be reduced, thereby saving more transmission overhead.

Embodiment V

After receiving the narrowband PBCH, the terminal may determine the location of the CRS in the current narrowband in the LTE system according to the CRS offset indicated by the E bit in the PBCH and the high and low frequency position indicated by the 1 bit with respect to the center frequency. For the CRS mapping of different system bandwidths including odd and even number of RBs shown in FIG. 1 and FIG. 2, it can be seen that for any case, it always starts incrementing with m'=110 in the band higher than the center frequency point. In the frequency band lower than the center frequency point, it always starts decreasing with m'=109. Therefore, it is not necessary to know the system bandwidth and whether the correspondence between RB and m' is as shown in FIG. 1 or FIG. 2, and as long as the value of m' incremented or decremented with respect to the center frequency point, the CRS of the corresponding position can be obtained. For example, the E bit indication value is 11, and 1 bit indicates the high frequency band, and offset indicated by the convention is the offset of the high-frequency end of the current narrowband relative to the center frequency point, and the CRS at the current narrowband position is the CRS offset to the high frequency band by 11 positions relative to the central frequency point position. That is, the CRS corresponding to the current narrow band is at the m'=109+11−1=119, and m'=109+11=120 position of the CRS sequence.

According to the embodiments of the present disclosure, because the CRS transmission indication information is carried in the narrowband PBCH, and the CRS transmission indication information is to indicate CRS port number and/or CRS frequency domain position in the LTE system. Through the CRS transmission indication information, it is able to enable the narrowband terminal working simultaneously with the LTE terminal in the LTE bandwidth to obtain the CRS in the LTE system, so that the narrowband downlink transmission may be demodulated through the CRS of the LTE system, and then the signal reception based on the CRS may be realized.

Based on the same technical concept, a narrowband PBCH transmission device is provided in some embodiments of the present disclosure, and the device may transmit a narrowband PBCH.

Figure 4:
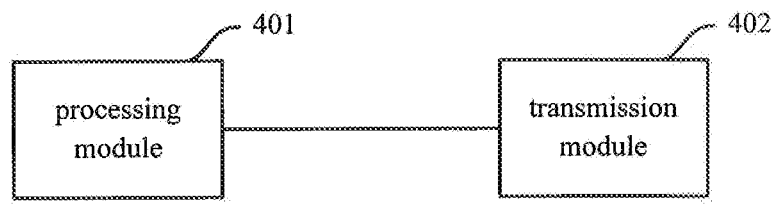
FIG. 4 is a schematic diagram of a narrowband PBCH transmission device in some embodiments of the present disclosure.

As shown in FIG. 4 the device includes a processing module 401 configured to carry CRS transmission indication information on a narrowband PBCH and a transmission module 402 configured to transmit the narrowband PBCH.

The specific content of the CRS transmission indication information and the transmission mode and information that can be carried in the narrowband PBCH may refer to the above embodiments, and the detailed description thereof is omitted herein.

Based on the same technical concept, a narrowband PBCH transmission device is provided in some embodiments of the present disclosure, and the device may receive a narrowband PBCH.

Figure 5:
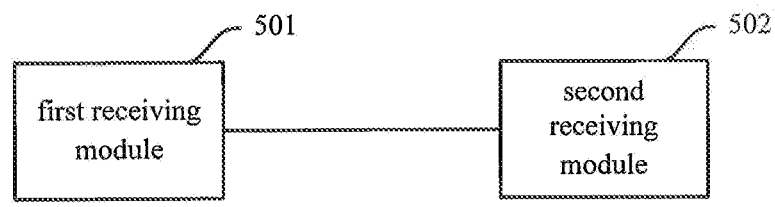
FIG. 5 is a schematic diagram of a narrowband PBCH transmission device in some embodiments of the present disclosure.

As shown in FIG. 5, the device includes a first receiving module 501, and a second receiving module 502, where the first receiving module 501 is configured to receive a narrowband PBCH carrying at least a common reference signal CRS transmission indication information, and the second receiving module 502 is configured to receive the CRS according to the CRS transmission indication information.

The specific content of the CRS transmission indication information and the transmission mode and information that can be carried in the narrowband PBCH may refer to the above embodiments, and the detailed description thereof is omitted herein.

Based on the same technical concept, a network side device is provided in some embodiments of the present disclosure, the network side device may transmit a narrowband PBCH. In a specific application scenario, the device may be a base station. For example, the base station may be an evolved base station (Evolved Node B, eNB or e-NodeB), a macro base station, a micro base station (also referred to as a "small base station"), a pico base station, an Access Point (AP) or a Transmission Point (TP) in an LTE system or an evolved system thereof.

Figure 6:
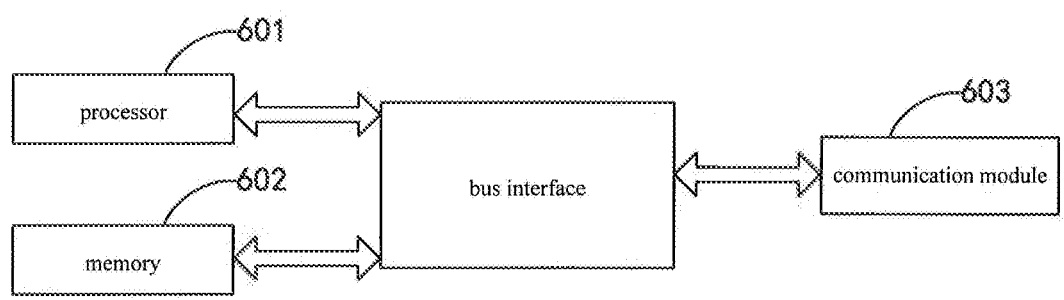
FIG. 6 is a schematic diagram of a network side device in some embodiments of the present disclosure.

FIG. 6 is a schematic diagram of a device in some embodiments of the present disclosure. As shown, the device may include a processor 601, a memory 602, a transceiver 603, and a bus interface.

The processor 601 is configured to manage the bus architecture and general processing, and the memory 602 may store data used by the processor 601 in performing operations. The transceiver 603 is configured to receive and transmit data under the control of the processor 601.

The bus architecture may include any number of interconnected buses and bridges, specifically linked by one or more processors represented by processor 601 and various circuits of memory represented by memory 602. The bus architecture can also link various other circuits such as peripherals, voltage regulators, power management circuits, and the like, which are well known in the art and therefore will not be further described herein. The bus interface provides the interface. The processor 601 is configured to manage the bus architecture and general processing, and the memory 602 can store data used by the processor 601 in performing operations.

The narrowband PBCH transmission procedure disclosed in the embodiment of the present disclosure may be applied to the processor 601 or implemented by the processor 601. In the implementation process, each step of the signal processing flow may be completed by an integrated logic circuit of hardware in the processor 601 or an instruction in the form of software. The processor 601 can be a general purpose processor, a digital signal processor, an application specific integrated circuit, a field programmable gate array or other programmable logic device, a discrete gate or transistor logic device, a discrete hardware component, and can implement or perform the embodiments of the present disclosure. The general purpose processor can be a microprocessor or any conventional processor or the like. The steps of the method disclosed in the embodiments of the present disclosure may be directly implemented as a hardware processor, or may be performed by a combination of hardware and software modules in the processor. The software module may be located in a mature storage medium in the field, such as random access memory, flash memory, read only memory, programmable read-only memory or electrically erasable programmable memory, registers, and the like. The storage medium is located in the memory 602, and the processor 601 reads the information in the memory 602 and completes the steps of the signal processing flow in conjunction with its hardware.

Specifically, the processor 601 is configured to read a program in the memory 602 to: transmit a narrowband PBCH carrying at least CRS transmission indication information.

The specific content of the CRS transmission indication information and the transmission mode and information that can be carried in the narrowband PBCH may refer to the above embodiments, and the detailed description thereof is omitted herein.

Based on the same technical concept, a terminal side device is provided in some embodiments of the present disclosure, the terminal side device may receive a narrowband PBCH. In a specific application scenario, the device may be a user equipment (UE), or may be called a Terminal, a mobile station (MS), a mobile terminal, etc., and the terminal may communicate with one or more core networks via a Radio Access Network (RAN). In particular, the terminal in the embodiments of the present disclosure refers to a narrowband terminal that can work in LTE or its evolved system, such as an Machine-Type Communication (MTC) terminal.

Figure 7:
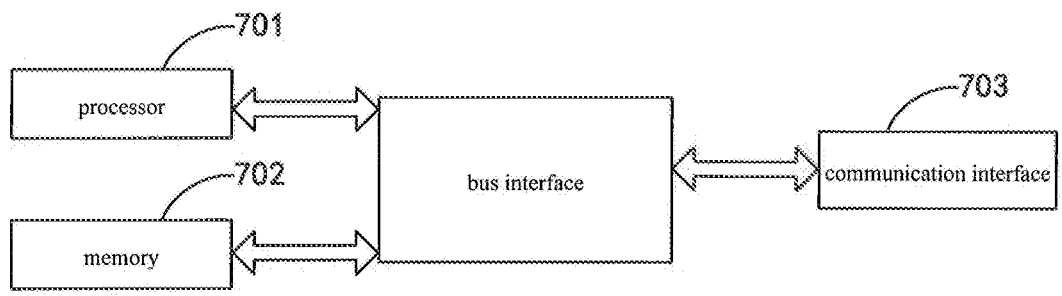
FIG. 7 is a schematic diagram of a terminal side device in some embodiments of the present disclosure.

As shown in FIG. 7, the device can include a processor 701, a memory 702, a transceiver 703, and a bus interface.

The processor 701 is configured to manage the bus architecture and general processing, and the memory 702 may store data used by the processor 701 in performing operations. The transceiver 703 is configured to receive and transmit data under the control of the processor 701.

The bus architecture may include any number of interconnected buses and bridges, specifically linked by one or more processors represented by processor 701 and various circuits of memory represented by memory 702. The bus architecture may also link various other circuits such as peripherals, voltage regulators, power management circuits, and the like, which are well known in the art and therefore will not be further described herein. The bus interface provides the interface. The processor 701 is configured to manage the bus architecture and general processing, and the memory 702 can store data used by the processor 701 in performing operations.

The narrowband PBCH transmission procedure in the embodiments of the present disclosure may be applied to the processor 701 or implemented by the processor 701. In the implementation process, each step of the signal processing flow may be completed by an integrated logic circuit of hardware in the processor 701 or an instruction in the form of software. The processor 701 may be a general purpose processor, a digital signal processor, an application specific integrated circuit, a field programmable gate array or other programmable logic device, a discrete gate or transistor logic device, a discrete hardware component and can implement or perform the embodiments of the present disclosure. The general purpose processor can be a microprocessor or any conventional processor or the like. The steps of the method disclosed in the embodiments of the present disclosure may be directly implemented as a hardware processor, or may be performed by a combination of hardware and software modules in the processor. The software module may be located in a mature storage medium in the field, such as random access memory, flash memory, read-only memory, programmable read-only memory or electrically erasable programmable memory, registers, and the like. The storage medium is located in the memory 702, and the processor 701 reads the information in the memory 702 and completes the steps of the signal processing flow in conjunction with its hardware.

Specifically, the processor 701 is configured to read a program in the memory 702 to: receiving a narrowband PBCH carrying at least common reference signal CRS transmission indication information. Further, the CRS is received according to the CRS transmission indication information.

The specific content of the CRS transmission indication information and the transmission mode and information that can be carried in the narrowband PBCH may refer to the above embodiments, and the detailed description thereof is omitted herein.

The present disclosure has been described with reference to the flow charts and/or block diagrams of the method, device (system) and computer program product according to the embodiments of the present disclosure. It should be understood that computer program instructions may be to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although some embodiments are described above, a person skilled in the art may make modifications and alterations to these embodiments in accordance with the basic concept of the present disclosure. So, the attached claims are intended to include the preferred embodiments and all of the modifications and alterations that fall within the scope of the present disclosure.

Obviously, a person skilled in the art may make further modifications and improvements without departing from the principle/spirit of the present disclosure, and these modifications and improvements shall also fall within the scope of the present disclosure.

What is claimed is:

1. A narrowband physical broadcast channel (PBCH) transmission method, comprising: transmitting by a network side device a narrowband PBCH carrying at least common reference signal (CRS) transmission indication information;
wherein the CRS transmission indication information comprises: CRS frequency domain position indication information in a Long Term Evolution (LTE) system; wherein
the CRS frequency domain position indication information is to indicate an offset of a frequency domain position of the narrowband transmission relative to a center frequency point in a LTE system bandwidth; or
the CRS frequency domain position indication information is to indicate a position of a CRS corresponding to a frequency domain resource of the narrowband transmission in a CRS sequence of the LTE system relative to the center frequency point in the LTE system bandwidth.

2. The narrowband PBCH transmission method according to claim 1, wherein the CRS transmission indication information further comprises:
CRS port number indication information in the LTE system.

3. The narrowband PBCH transmission method according to claim 2, wherein the CRS port number indication information comprises:
1-bit CRS port number indication information to indicate 1-port CRS transmission or 2-port CRS transmission; or
2-bit CRS port number indication information to indicate 1-port CRS transmission, 2-port CRS transmission or 4-port CRS transmission.

4. The narrowband PBCH transmission method according to claim 1, wherein the CRS frequency domain position indication information is to indicate the offset of the frequency domain position of the narrowband transmission relative to the center frequency point in the LTE system bandwidth, the CRS frequency domain position indication information comprises:
1-bit indication information to indicate that a frequency domain resource of the narrowband transmission is located at a high frequency band or a low frequency band divided by the center frequency point of the LTE system bandwidth; and C-bit indication information to indicate an offset of the frequency domain position of the narrowband transmission relative to the center frequency point, wherein the offset is a subcarrier offset or calculated in units of one half of RB or six subcarriers;
or
1-bit indication information to indicate that the LTE system bandwidth comprises an odd or an even number of available RBs; 1-bit indication information to indicate that a frequency domain resource of the narrowband transmission is located at a high frequency band or a low frequency band divided by the center frequency point of the LTE system bandwidth; and D-bit indication information to indicate a RB offset of the frequency domain position of the narrowband transmission relative to the center frequency point or a center RB of the LTE system bandwidth, wherein the RB offset is an integer number of RBs.

5. The narrowband PBCH transmission method according to claim 4, wherein in the case that the offset is the subcarrier offset, $$C = \left\lceil \log_2 \left( N_{sc}^{RB} \times \max_{i \in A} (N_{RB,i}^{DL})/2 \right) \right\rceil,$$

wherein $N_{RB,i}^{DL}$ is the quantity of available RBs in each of A types of LTE system bandwidth, $N_{sc}^{RB}$ is the quantity of subcarriers of one RB in the LTE system, or C=10; or in the case that the offset is calculated in units of one half of RB or six subcarriers, $$C = \left\lceil \log_2 \max_{i \in A} (N_{RB,i}^{DL}) \right\rceil,$$

wherein $N_{RB,i}^{DL}$ is the quantity of available RBs in each of the A types of LTE system bandwidth; or C=7;
or $$D = \left\lceil \log_2 \left( \max_{i \in A} (N_{RB,i}^{DL})/2 \right) \right\rceil,$$

wherein $N_{RB,i}^{DL}$ is the quantity of available RBs in each of the A types of LTE system bandwidth; or D=6.

6. The narrowband PBCH transmission method according to claim 1, wherein the CRS frequency domain position indication information is to indicate the position of the CRS corresponding to the frequency domain resource of the narrowband transmission in the CRS sequence of the LTE system relative to the center frequency point in the LTE system bandwidth, the CRS frequency domain position indication information comprises:
1-bit indication information to indicate that a frequency domain resource of the narrowband transmission is located at a high frequency band or a low frequency band divided by the center frequency point of the LTE system bandwidth; and
E-bit indication information to indicate a CRS offset of the CRS corresponding to the frequency domain resource of the narrowband transmission relative to the center frequency point.

7. The narrowband PBCH transmission method according to claim 6, wherein $$E = \left\lceil \log_2 \max_{i \in A}(N_{RB,i}^{DL}) \right\rceil,$$

$N_{RB,i}^{DL}$ is the quantity of available RBs in each of A types of LTE system bandwidth; or E=7.

8. The narrowband PBCH transmission method according to claim 1, wherein the narrowband PBCH further carries one or two of the following indication information:
   indication information to indicate whether the narrowband comprises an LTE control region;
   indication information to indicate a size of the LTE control region.

9. A narrowband physical broadcast channel (PBCH) receiving method, comprising: receiving by a terminal side device a narrowband PBCH carrying common reference signal (CRS) transmission indication information;
   wherein the CRS transmission indication information comprises: CRS frequency domain position indication information in a Long Term Evolution (LTE) system; wherein
   the CRS frequency domain position indication information is to indicate an offset of a frequency domain position of the narrowband transmission relative to a center frequency point in a LTE system bandwidth; or
   the CRS frequency domain position indication information is to indicate a position of a CRS corresponding to a frequency domain resource of the narrowband transmission in a CRS sequence of the LTE system relative to the center frequency point in the LTE system bandwidth.

10. The narrowband PBCH receiving method according to claim 9, wherein the CRS transmission indication information further comprises:
    CRS port number indication information in the LTE system.

11. The narrowband PBCH receiving method according to claim 10, the CRS port number indication information comprises:
    1-bit CRS port number indication information to indicate 1-port CRS transmission or 2-port CRS transmission; or
    2-bit CRS port number indication information to indicate 1-port CRS transmission, 2-port CRS transmission or 4-port CRS transmission.

12. The narrowband PBCH receiving method according to claim 9, wherein the CRS frequency domain position indication information is to indicate the offset of the frequency domain position of the narrowband transmission relative to the center frequency point in the LTE system bandwidth, the CRS frequency domain position indication information comprises:
    1-bit indication information to indicate that a frequency domain resource of the narrowband transmission is located at a high frequency band or a low frequency band divided by the center frequency point of the LTE system bandwidth; C-bit indication information to indicate an offset of the frequency domain position of the narrowband transmission relative to the center frequency point, wherein the offset is a subcarrier offset or calculated in units of one half of RB or six subcarriers;
    or
    1-bit indication information to indicate that the LTE system bandwidth comprises an odd or an even number of available RBs; 1-bit indication information to indicate that a frequency domain resource of the narrowband transmission is located at a high frequency band or a low frequency band divided by the center frequency point of the LTE system bandwidth; and D-bit indication information to indicate a RB offset of the frequency domain position of the narrowband transmission relative to the center frequency point or a center RB of the LTE system bandwidth, wherein the RB offset is an integer number of RBs.

13. The narrowband PBCH receiving method according to claim 12, wherein in the case that the offset is the subcarrier offset, $$C = \left\lceil \log_2 \left( N_{sc}^{RB} \times \max_{i \in A}(N_{RB,i}^{DL})/2 \right) \right\rceil,$$

wherein $N_{RB,i}^{DL}$ is the quantity of available RBs in each of A types of LTE system bandwidth, $N_{sc}^{RB}$ is the quantity of subcarriers of one RB in the LTE system, or C=10; or in the case that the offset is calculated in units of one half of RB or six subcarriers, $$C = \left\lceil \log_2 \max_{i \in A}(N_{RB,i}^{DL}) \right\rceil,$$

wherein $N_{RB,i}^{DL}$ is the quantity of available RBs in each of the A types of LTE system bandwidth; or C=7;
   or $$D = \left\lceil \log_2 \left( \max_{i \in A}(N_{RB,i}^{DL})/2 \right) \right\rceil,$$

wherein $N_{RB,i}^{DL}$ is the quantity of available RBs in each of the A types of LTE system bandwidth; or D=6.

14. The narrowband PBCH receiving method according to claim 9, wherein the CRS frequency domain position indication information is to indicate the position of the CRS corresponding to the frequency domain resource of the narrowband transmission in the CRS sequence of the LTE system relative to the center frequency point in the LTE system bandwidth, the CRS frequency domain position indication information comprises:
    1-bit indication information to indicate that a frequency domain resource of the narrowband transmission is located at a high frequency band or a low frequency band divided by the center frequency point of the LTE system bandwidth;
    E-bit indication information to indicate a CRS offset of the CRS corresponding to the frequency domain resource of the narrowband transmission relative to the center frequency point.

15. The narrowband PBCH receiving method according to claim 14, wherein $$E = \left\lceil \log_2 \max_{i \in A}(N_{RB,i}^{DL}) \right\rceil,$$

$N_{RB,i}^{DL}$ is the quantity of available RBs in each of A types of LTE system bandwidth; or E=7.

16. The narrowband PBCH receiving method according to claim 9, wherein the narrowband PBCH further carries one or two of the following indication information: indication information to indicate whether the narrowband comprises an LTE control region; indication information to indicate a size of the LTE control region.

17. A narrowband physical broadcast channel (PBCH) transmission device, comprising a processor, a memory, a transceiver and a bus interface connected to each other via a bus, wherein the processor is configured to read a program in the memory to enable the narrowband PBCH transmission device to:
　carry, via the transceiver, common reference signal (CRS) transmission indication information on a narrowband PBCH; and
　transmit, via the transceiver, the narrowband PBCH;
　wherein the CRS transmission indication information comprises: CRS frequency domain position indication information in a Long Term Evolution (LTE) system;
　wherein the CRS frequency domain position indication information is to indicate an offset of a frequency domain position of the narrowband transmission relative to a center frequency point in a LTE system bandwidth; or
　the CRS frequency domain position indication information is to indicate a position of a CRS corresponding to a frequency domain resource of the narrowband transmission in a CRS sequence of the LTE system relative to the center frequency point in the LTE system bandwidth.

18. The narrowband PBCH transmission device according to claim 17, wherein the CRS transmission indication information further comprises: CRS port number indication information in the LTE system.

19. The narrowband PBCH transmission device according to claim 18, wherein the CRS port number indication information comprises:
　1-bit CRS port number indication information to indicate 1-port CRS transmission or 2-port CRS transmission; or
　2-bit CRS port number indication information to indicate 1-port CRS transmission, 2-port CRS transmission or 4-port CRS transmission.

20. The narrowband PBCH transmission device according to claim 17, wherein the CRS frequency domain position indication information is to indicate the offset of the frequency domain position of the narrowband transmission relative to the center frequency point in the LTE system bandwidth, the CRS frequency domain position indication information comprises:
　1-bit indication information to indicate that a frequency domain resource of the narrowband transmission is located at a high frequency band or a low frequency band divided by the center frequency point of the LTE system bandwidth; and C-bit indication information to indicate an offset of the frequency domain position of the narrowband transmission relative to the center frequency point, wherein the offset is a subcarrier offset or calculated in units of one half of RB or six subcarriers;
　or
　1-bit indication information to indicate that the LTE system bandwidth comprises an odd or an even number of available RBs; 1-bit indication information to indicate that a frequency domain resource of the narrowband transmission is located at a high frequency band or a low frequency band divided by the center frequency point of the LTE system bandwidth; and D-bit indication information to indicate a RB offset of the frequency domain position of the narrowband transmission relative to the center frequency point or a center RB of the LTE system bandwidth, wherein the RB offset is an integer number of RBs.

21. The narrowband PBCH transmission device according to claim 20, wherein in the case that the offset is the subcarrier offset, $$C = \left\lceil \log_2 \left( N_{sc}^{RB} \times \max_{i \in A} (N_{RB,i}^{DL}) / 2 \right) \right\rceil,$$

wherein $N_{RB,i}^{DL}$ is the quantity of available RBs in each of A types of LTE system bandwidth, $N_{sc}^{RB}$ is the quantity of subcarriers of one RB in the LTE system, or C=10; or in the case that the offset is calculated in units of one half of RB or six subcarriers, $$C = \left\lceil \log_2 \max_{i \in A} (N_{RB,i}^{DL}) \right\rceil,$$

wherein $N_{RB,i}^{DL}$ is the quantity of available RBs in each of the A types of LTE system bandwidth; or C=7;
　or $$D = \left\lceil \log_2 \left( \max_{i \in A} (N_{RB,i}^{DL}) / 2 \right) \right\rceil,$$

wherein $N_{RB,i}^{DL}$ is the quantity of available RBs in each of the A types of LTE system bandwidth; or D=6.

22. The narrowband PBCH transmission device according to claim 17, wherein the CRS frequency domain position indication information is to indicate the position of the CRS corresponding to the frequency domain resource of the narrowband transmission in the CRS sequence of the LTE system relative to the center frequency point in the LTE system bandwidth, the CRS frequency domain position indication information comprises:
　1-bit indication information to indicate that a frequency domain resource of the narrowband transmission is located at a high frequency band or a low frequency band divided by a center frequency point of a LTE system bandwidth;
　E-bit indication information to indicate a CRS offset of the CRS corresponding to the frequency domain resource of the narrowband transmission relative to the center frequency point.

23. The narrowband PBCH transmission device according to claim 22, wherein $$E = \left\lceil \log_2 \max_{i \in A} (N_{RB,i}^{DL}) \right\rceil,$$

$N_{RB,i}^{DL}$ is the quantity of available RBs in each of A types of LTE system bandwidth; or E=7.

24. The narrowband PBCH transmission device according to claim 17, wherein the narrowband PBCH further carries one or two of the following indication information: indication information to indicate whether the narrowband comprises an LTE control region; indication information to indicate a size of the LTE control region.

25. A narrowband physical broadcast channel (PBCH) receiving device, comprising a processor, a memory, a transceiver and a bus interface connected to each other via a bus, wherein the processor is configured to read a program in the memory to enable the narrowband PBCH receiving device to: receive, via the transceiver, a narrowband PBCH carrying at least common reference signal (CRS) transmission indication information;

wherein the CRS transmission indication information comprises: CRS frequency domain position indication information in a Long Term Evolution (LTE) system;

wherein the CRS frequency domain position indication information is to indicate an offset of a frequency domain position of the narrowband transmission relative to a center frequency point in a LTE system bandwidth; or the CRS frequency domain position indication information is to indicate a position of a CRS corresponding to a frequency domain resource of the narrowband transmission in a CRS sequence of the LTE system relative to the center frequency point in the LTE system bandwidth.

26. The narrowband PBCH receiving device according to claim 25, wherein the CRS transmission indication information further comprises: CRS port number indication information in the LTE system.

27. The narrowband PBCH receiving device according to claim 26, wherein the CRS port number indication information comprises:
1-bit CRS port number indication information to indicate 1-port CRS transmission or 2-port CRS transmission; or
2-bit CRS port number indication information to indicate 1-port CRS transmission, 2-port CRS transmission or 4-port CRS transmission.

28. The narrowband PBCH receiving device according to claim 25, wherein the CRS frequency domain position indication information is to indicate the offset of the frequency domain position of the narrowband transmission relative to the center frequency point in the LTE system bandwidth, the CRS frequency domain position indication information comprises:
1-bit indication information to indicate that a frequency domain resource of the narrowband transmission is located at a high frequency band or a low frequency band divided by the center frequency point of the LTE system bandwidth; and C-bit indication information to indicate an offset of the frequency domain position of the narrowband transmission relative to the center frequency point, wherein the offset is a subcarrier offset or calculated in units of one half of RB or six subcarriers;
or
1-bit indication information to indicate that the LTE system bandwidth comprises an odd or an even number of available RBs; 1-bit indication information to indicate that a frequency domain resource of the narrowband transmission is located at a high frequency band or a low frequency band divided by the center frequency point of the LTE system bandwidth; and D-bit indication information to indicate a RB offset of the frequency domain position of the narrowband transmission relative to the center frequency point or a center RB of the LTE system bandwidth, wherein the RB offset is an integer number of RBs.

29. The narrowband PBCH receiving device according to claim 28, wherein in the case that the offset is the subcarrier onset, $$C = \left\lceil \log_2\left(N_{sc}^{RB} \times \max_{i \in A}(N_{RB,i}^{DL})/2\right) \right\rceil,$$

wherein $N_{RB,i}^{DL}$ is the quantity of available RBs in each of A types of LTE system bandwidth, $N_{sc}^{RB}$ is the quantity of subcarriers of one RB in the LTE system, or C=10; or in the case that the offset is calculated in units of one half of RB or six subcarriers, $$C = \left\lceil \log_2 \max_{i \in A}(N_{RB,i}^{DL}) \right\rceil,$$

wherein $N_{RB,i}^{DL}$ is the quantity of available RBs in each of the A types of LTE system bandwidth; or C=7;
or $$D = \left\lceil \log_2\left(\max_{i \in A}(N_{RB,i}^{DL})/2\right) \right\rceil,$$

wherein $N_{RB,i}^{DL}$ is the quantity of available RBs in each of the A types of LTE system bandwidth; or D=6.

30. The narrowband PBCH receiving device according to claim 25, wherein the CRS frequency domain position indication information is to indicate the position of the CRS corresponding to the frequency domain resource of the narrowband transmission in the CRS sequence of the LTE system relative to the center frequency point in the LTE system bandwidth, the CRS frequency domain position indication information comprises:
1-bit indication information to indicate that a frequency domain resource of the narrowband transmission is located at a high frequency band or a low frequency band divided by the center frequency point of the LTE system bandwidth;
E-bit indication information to indicate a CRS offset of the CRS corresponding to the frequency domain resource of the narrowband transmission relative to the center frequency point.

31. The narrowband PBCH receiving device according to claim 30, wherein $$E = \left\lceil \log_2 \max_{i \in A}(N_{RB,i}^{DL}) \right\rceil,$$

$N_{RB,i}^{DL}$ is the quantity of available RBs in each of A types of LTE system bandwidth; or E=7.

32. The narrowband PBCH receiving device according to claim 25, wherein the narrowband PBCH further carries one or two of the following indication information: indication information to indicate whether the narrowband comprises an LTE control region; indication information to indicate a size of the LTE control region.

* * * * *